Oct. 24, 1933.   W. I. THRALL   1,931,777
GAS PRESSURE REGULATOR
Filed Oct. 24, 1930
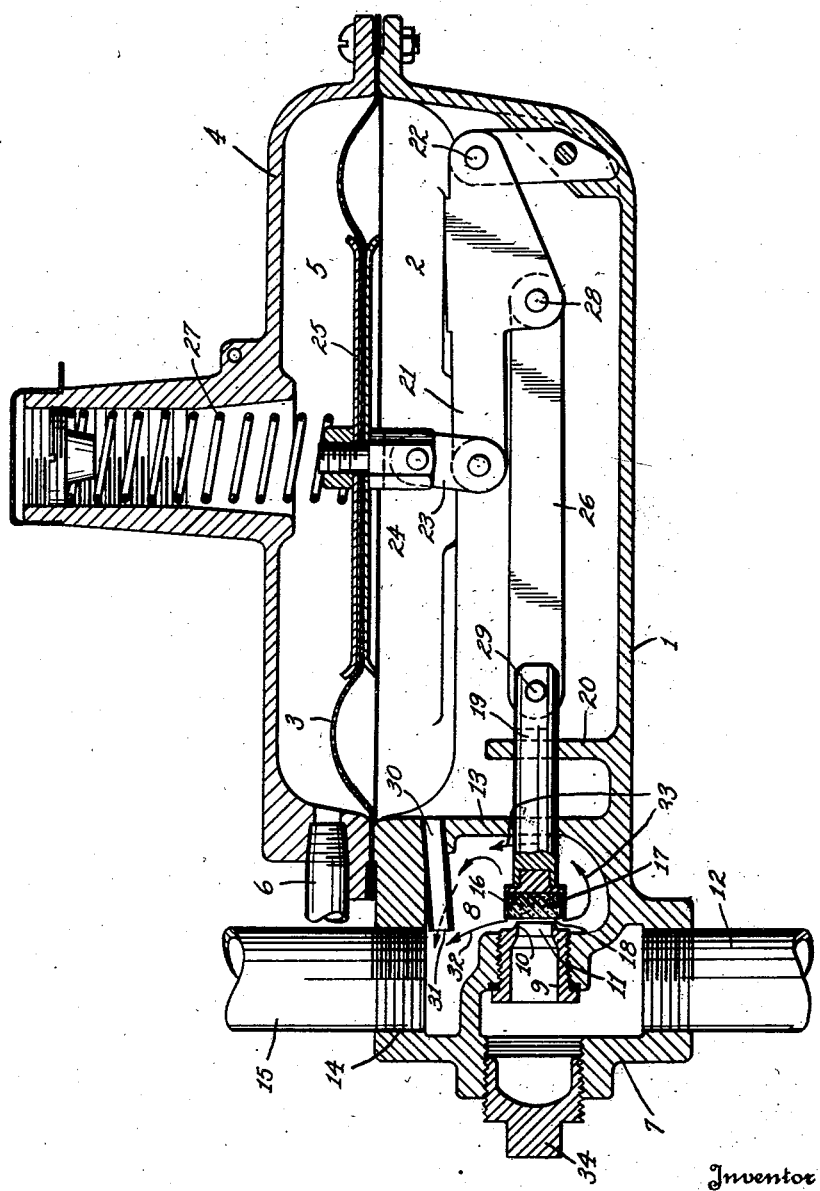
Inventor
Walter I. Thrall
By Lyon & Lyon
Attorneys Patented Oct. 24, 1933

1,931,777

UNITED STATES PATENT OFFICE 1,931,777

GAS-PRESSURE REGULATOR

Walter I. Thrall, Los Angeles, Calif., assignor, by mesne assignments, to Reliance Regulator Corporation, Los Angeles, Calif., a corporation of California Application October 24, 1930. Serial No. 490,925

3 Claims. (Cl. 50—26)

This invention relates to gas pressure regulators. Such regulators are used on a gas consumer's line and operate automatically to give an increased gas supply to the line to correspond with increased consumption of gas. Regulators of this type usually include a pressure chamber in which the gas accumulates, and the gas pressure in this chamber is controlled automatically and usually through the medium of a flexible diaphragm produces slight regulating movements of the valve, that is to say, if the consumption of gas increases, the flow of gas through the regulator automatically develops changes in the pressure of the regulating chamber which will effect an increased opening of the valve to supply the increased gas consumption.

The general object of the invention is to produce a compact regulator of this type, of simple construction, and which will operate to effect a very close regulation of the valve opening to correspond with changes in the rate of gas consumption beyond the regulator.

While this invention is capable of being applied to gas regulators of any type where the pressure in a gas chamber is controlled by the rate of flow through the regulator, in the present embodiment of the invention the apparatus includes a regulating pressure chamber having a regulating duct that connects with the valve chamber. One of the objects of my invention is to provide a regulator in which this duct will cooperate most effectively with the flowing gas to develop a very sensitive control of pressure in the regulating chamber and thereby effect a very close control of the valve opening.

Further objects of the invention will appear hereinafter.

The invention consists of novel parts and combinations of parts to be described hereinafter, all of which contribute to produce an efficient gas pressure regulator.

A preferred embodiment of the invention is described in the following specification, while the broad scope of the invention is pointed out in the appended claims.

In the drawing the view is a vertical central section taken through a regulator embodying my invention, certain parts being broken away.

Before proceeding to a detail description of the invention, it should be stated that in applying the invention I admit the gas to the regulator through a valve opening having a seat cooperating with a valve closure that is controlled by the diaphragm of the regulating chamber so that the forward face of the valve closure lies very close to the valve seat and cooperates with the valve seat to form a relatively narrow annular passage through which the gas flows in passing into the valve chest. At another point the valve chest is provided with an outlet and between this outlet and the valve opening I locate the regulating duct or port that leads from the regulating chamber into the valve chest. Furthermore, by reason of the restricted annular passage at the valve opening through which the gas must flow, the gas at this point has a relatively high velocity and hence, any changes in the velocity through the supply line in carrying the regulator will produce relatively great changes in the velocity at this point. According to my invention it is preferable to locate the outlet end of the regulating duct that leads from the pressure chamber so that it is substantially in line with the valve seat, thereby subjecting it to the relatively great changes in velocity that will occur at this point.

In practicing the invention I also prefer to construct the valve chamber as an integral part of the casing that carries the pressure regulating chamber, providing a dividing wall between the valve chest and the regulating chamber. I prefer to admit the gas through a valve opening that enables the gas to flow toward and against this dividing wall after passing through the valve. In this way, I utilize the gas currents that flow in the valve chamber and that do not flow directly to the valve chest outlet, to increase the inductive action on the regulating duct. In order to accomplish this it is preferable to employ a regulating duct formed of a tube that projects through the dividing wall with its end extending into the valve chest in such a way that it not only terminates substantially in line with the high velocity gas current passing directly from the valve to the valve chest outlet, but is also subjected to a current of gas passing in the valve chest in the general direction in which the tube projects.

Referring more particularly to the drawing, 1 represents the valve casing which is preferably a casting having the usual substantially circular gas regulating chamber 2 which is closed on one side, usually the upper side, by a flexible diaphragm 3, said diaphragm being held in place by a removable bonnet 4. In the present instance, the bonnet 4 encloses an air chamber 5 which is vented to the atmosphere through a vent pipe or tube 6. At one side the casing 1 is formed into a valve chest 7 having a valve chamber 8 formed therein into which the gas is admitted through a valve 9. This valve is preferably in the form of a bushing having an annular seat 10 surrounding a valve opening 11. The gas is admitted through an inlet pipe 12 of the consumer's line so that when the gas flows through the valve opening 11, it flows in the direction of an integral dividing wall 13 that separates the valve chamber 8 from the regulating chamber 2. Opposite the inlet 12 the valve chest is provided with an outlet 14 to which an outlet pipe 15 may be attached.

Cooperating with the valve opening 11 I provide a valve closure 16 which is preferably in the form of a hollow head carrying a packing or cushion 17 to come upon the valve seat, and the forward face 18 of this valve closure is preferably substantially flat and preferably of larger diameter than the valve seat.

The center of the diaphragm is preferably connected by a suitable actuating mechanism with the stem 19 of the valve closure, which stem is guided to slide through the dividing wall 13 and if desired, a second guiding wall 20 may be provided for insuring accurate guiding of the valve. The actuating mechanism connecting the diaphragm with the valve stem 19 may include a rock lever 21 having a fixed fulcrum pin at 22 on the side of the casing opposite to the valve. The forward end of this rock lever is connected by a link 23 to a bolt head 24 that is attached to the center of the diaphragm and the diaphragm plates 25. The underside of the rocking lever is connected by a link 26 with the rear end of the valve stem 19.

A coil spring 27 is preferably provided on the upper side of the diaphragm to give a more positive action of the diaphragm in actuating the valve closure as the diaphragm moves down. When the regulator is in operation the pivot pin 28 that connects the link 26 to the rocking lever 21 is below the line connecting the pin 29 at the forward end of the link with the fulcrum pin 22.

Between the regulating chamber 2 and the valve chest 8 I prefer to provide a regulating duct which is formed by means of a tube 30 of small diameter that extends through the dividing wall 13 and projects into the interior of the valve chest 8, with the inner end 31 of the tube substantially in line with the plane of the valve seat 10 but preferably displaced slightly beyond the same and toward the outlet opening 14. In other words, this outlet end of the regulating tube 30 is preferably located at a point where it is subjected to the action of the current of gas immediately when it flows from the annular passage between the valve seat and the face 18.

As the gas issues at this point, it will be evident that on the upper side of the valve seat a current of gas will flow substantially in the direction indicated by the arrow 32, being guided in this direction by the flat face 18 of the valve closure. In this way the interior of the tube 30 will be subjected to the action of a high velocity gas current immediately passing from the valve seat and passing across the end face of the tube.

In addition to this the gas that flows laterally and from the underside of the valve will develop currents, as indicated by the arrows 33, that will pass back against the face of the dividing wall 13 and this current will be deflected upwardly by this wall and form an auxiliary gas current flowing past the delivery mouth of the tube 30 and in the same general direction in which the tube projects. In this way this auxiliary gas current is made to assist in inducing a flow in the tube 30. Access may be had to the valve bushing 9 through a removable screw cap 34.

The area of effective opening through the valve is, of course, considerably less than the area of the consumer's line or pipes 12 and 15. Hence, any changes in the amount of gas being consumed will produce relatively great changes in velocity as the gas flows through the relatively narrow annular passage at the valve. In the operation of the regulator if the consumption of gas by the consumer materially increases, the velocity of flow at the valve will substantially increase and this will develop an induction flow in the tube 30 from the chamber 2, thereby reducing pressure in this chamber and permitting the diaphragm 3 to move downwardly.

This will cause a slight downward rotation of the rocking lever 21 on its pivot 20 which will move the valve closure 16 to further open the valve. On the other hand, when the rate of consumption of gas by the consumer becomes reduced, the gas pressure will back up slightly in the line and produce a slight increase in pressure in the chamber 2 which will cause a slight raise in the diaphragm, thereby moving the valve closure 16 nearer to the valve seat 10 and reducing the effective opening through the valve.

It will be noted that the end 31 of the tube as illustrated in the figure projects unobstructedly into the current of gas flowing from the valve inlet to the outlet; that is to say, this end of the tube is located in the gas passage at a point where the flow of gas through the passage is unobstructed.

It is understood that the embodiment of the invention described herein is only one of the many embodiments this invention may take, and I do not wish to be limited in the practice of the invention, nor in the claims, to the particular embodiment set forth.

What I claim is:

1. In a gas pressure regulator, the combination of a casing having a regulating pressure chamber with a valve chest formed at one side and having a dividing wall separating the pressure chamber from the valve chest, a diaphragm mounted in the casing and forming a wall of the pressure chamber, said valve chest having a restricted valve opening with a valve seat, through which the gas is admitted, a valve-closure guided through the said dividing wall with its forward face lying adjacent to the valve seat and cooperating therewith to form an annular inlet for the gas, actuating mechanism connecting the diaphragm and the valve-closure, said valve chest having an outlet, and an induction tube located between the valve opening and the said outlet, extending through the dividing wall and opening communication between the pressure chamber and the valve chest, said tube having its end projecting into the valve chest to a point substantially in line with the valve seat, and in the path of the current of gas as it passes immediately from the valve seat, said valve closure being positioned and said chamber being shaped to cause the gas to move in two paths, one at right angles to the eduction tube and across the opening thereof, and the other longitudinally of said eduction tube and along the walls of the chamber, whereby the induction tube is subjected to the changes of velocity of the gas immediately when it flows from the valve opening.

2. In a gas pressure regulator, the combination of a casing having a valve chest, with a valve opening through which the gas is admitted into the regulator, said valve opening having an annular valve seat, a valve-closure having an end face to come upon the said seat and movable toward and from the same and cooperating with the said seat to form an annular passage for the gas passing into the valve chest through the valve opening, pressure controlled means for moving the closure to regulate the amount of opening at the valve, and including a regulating pressure chamber with a regulating duct extending from the regulating chamber and terminating substantially in line with the plane of the valve seat, said valve closure and said chamber being shaped to cause gas to move in two paths, one at right angles to the duct and across the face thereof and another longitudinally of said duct and along the walls of the chamber so that the end of the regulating duct lies in the path of the current of gas immediately passing from the valve seat and is subjected to the changes in velocity of the said current as it flows from the valve seat.

3. In a gas pressure regulator, the combination of a casing having a regulating pressure chamber with a valve chest having an outlet formed at one side of the casing, said valve chest having an inlet passageway with a wall dividing the valve chest from the pressure chamber, said valve chest having a valve-opening opposite the dividing wall so that a portion of the admitted gas passes through the said valve opening and flows against the said dividing wall, said valve opening having an annular valve seat, a valve closure guided to slide through the said dividing wall, and having an end face cooperating with the valve-seat to form an annular passage through which the gas flows in passing into the valve chest, the valve closure being located outside of the inlet passage and facing said inlet passage, pressure controlled means for moving the valve closure to regulate the amount of opening at the valve, and including a regulating pressure-chamber, and a regulating tube projecting into the valve chest from the regulating chamber terminating between the valve-opening and said outlet and terminating also substantially in line with the plane of the valve-opening so that the regulating tube is subjected to changes in velocity of the current of gas immediately as it flows from the valve opening and also to the induction effect of the gas that strikes the dividing wall and flows past the regulating tube to the valve chest outlet.

WALTER I. THRALL.